July 14, 1931.  G. B. BURNHAM  1,814,284
PROCESS OF OBTAINING POTASSIUM SODIUM SULPHATE
Filed Nov. 16, 1925
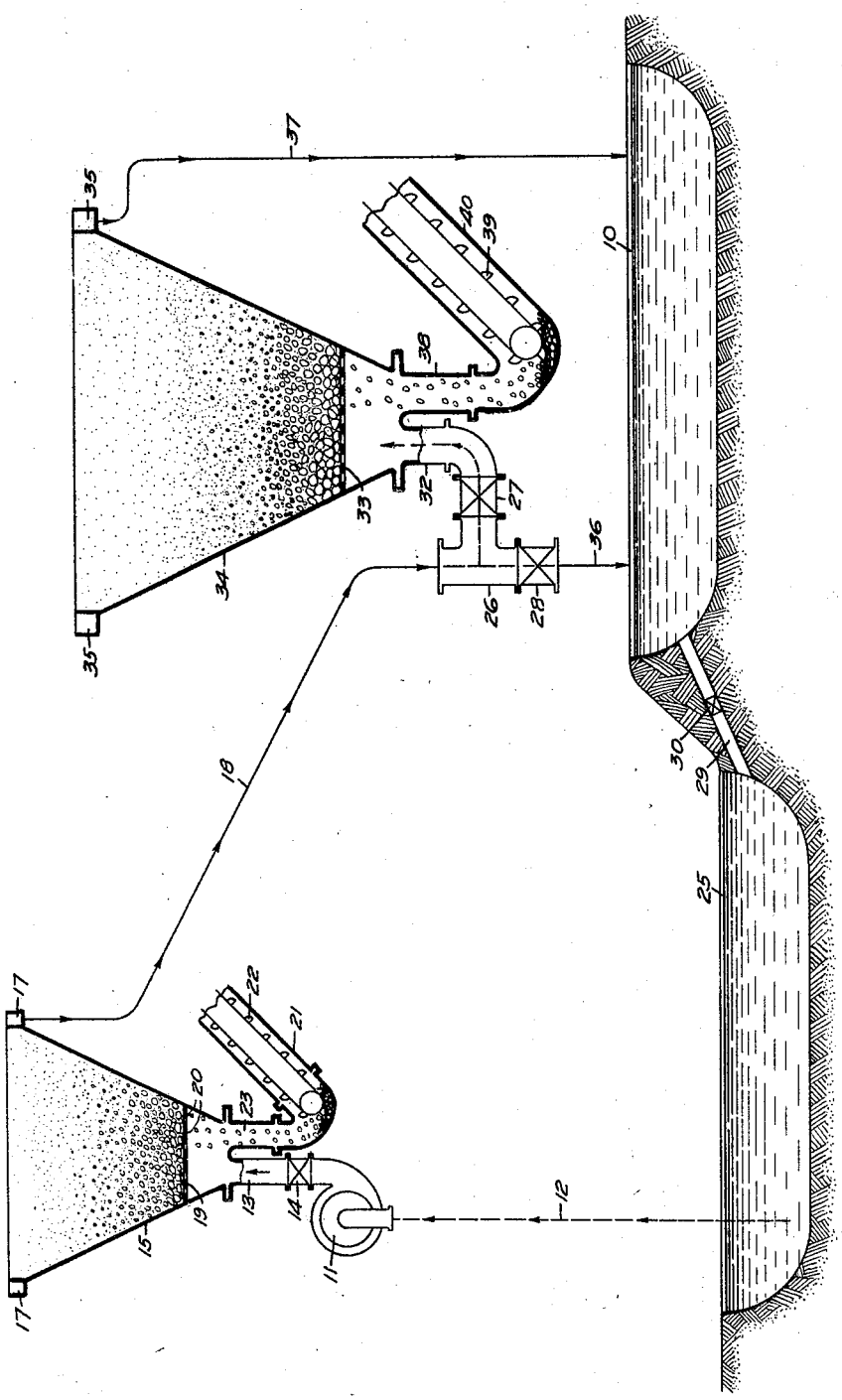
INVENTOR
George B. Burnham
BY White & First
his ATTORNEYS Patented July 14, 1931

1,814,284

UNITED STATES PATENT OFFICE

GEORGE B. BURNHAM, OF RENO, NEVADA, ASSIGNOR TO BURNHAM CHEMICAL COMPANY, OF RENO, NEVADA, A CORPORATION OF NEVADA

PROCESS OF OBTAINING POTASSIUM SODIUM SULPHATE

Application filed November 16, 1925. Serial No. 69,271.

My invention relates to a process for obtaining crystalline potassium sodium sulphate, sometimes called glazerite, from a complex saline liquor containing the same, and to apparatus which may conveniently be used in carrying out the process. My copending application entitled "Process of and apparatus for obtaining sodium chloride," Serial No. 69,275, filed November 16, 1925, is for a process and apparatus in some respects comparable to the process and apparatus described herein, and matter disclosed but not claimed in this application is claimed therein.

An object of my invention is to provide an economical process for obtaining potassium sodium sulphate from saline liquors containing the same and other salts.

Another object of the invention is to provide a process by means of which a salt above that of the lowest solubility may be obtained from a complex brine.

A further object of my invention is to provide apparatus in which a plurality of salts may be recovered from brine containing the same.

An additional object of my invention is to provide apparatus which will recover crystals of a number of different salts from brine containing the same, and segregate the crystals according to size and kind.

The invention possesses other advantageous features, some of which with the foregoing, will be set forth at length in the following description where I shall outline in full the preferred form of the process and the embodiment of means for practising the same which I have selected for illustration in the drawings accompanying and forming part of the present specification. In said drawings I have shown one form of apparatus for practising the process of my invention, but it is to be understood that I do not limit myself to such form, since the invention as set forth in the claims may be embodied in a plurality of forms. In the drawings:

Fig. 1 is a diagrammatic representation of the apparatus by means of which I practise my process, the crystallizing tanks and associated parts and the evaporation ponds being shown in transverse section, and the direction of flow of the saline liquor being indicated by lines provided with arrow heads.

Broadly considered, the process of my invention preferably comprises flowing saline liquor supersaturated with a plurality of salts upwardly with a diminishing velocity thru a bed of crystals of one of the salts, allowing the crystals growing larger than a certain size to drop out of the upward current of liquor into a collecting container, collecting the large salt crystals, again flowing the liquor upwardly with a diminishing velocity thru a bed of crystals, this time the crystals being those of another of the supersaturated salts, allowing the crystals growing larger than a certain size to drop out of the upward current of liquor into a second collecting container, collecting the large salt crystals, treating the liquor to saturate it again with a plurality of salts, and repeating the process.

I shall describe the process as it is used in connection with the natural saline brine occurring subterraneously at Searles Lake, California, and with which solar evaporation is used. The method of obtaining potassium sodium sulphate will be outlined but it will be apparent that other natural or artificial brines may be used and other salts may be recovered.

In Searles Lake brine, which is a complex solution containing several salts, complicated reactions are always occurring. Molecules of the different salts are dissociated into ions, and ions of the various salts are united to form molecules of other salts. A certain amount of interference takes place between the ions and the molecules with the result that crystallization takes place slowly. Also, molecules of relatively high solubility form momentarily, delaying crystallization even more.

The complicated solution may be concentrated until it is in most respects saturated or supersaturated, in the ordinary sense of the word, with a certain salt or a number of salts. There is the important exception however, that seeding with one crystal of a salt in such a complex supersaturated solution will not cause crystallization of that salt. It it necessary to bring the solution into intimate contact with a large surface of crystals of a salt to produce crystallization of one salt from the liquor.

In order to effect the recovery of salts by my process, the saline solution, if not concentrated, must first be evaporated to bring the solution to saturation with the salts. It is preferred to evaporate by natural solar evaporation as that is the cheapest method, but artificial evaporation can be used if desired.

The subterranean Searles Lake brine which is saturated with sodium chloride is pumped into a large pond 10 to evaporate by exposure to the sun and wind. One pond can be used to operate the process or a plurality of ponds may be used. In the latter case, as the brine evaporates and becomes more and more concentrated, it is allowed to flow by gravity from one pond 10 to another pond 25, thru a passage 29 controlled by a suitable valve 30.

The brine is exposed to the weather until it is saturated with the desired salt, in this case potassium sodium sulphate. In the day time the sun evaporates water from the liquid and increases its concentration, and at night sodium chloride and potassium sodium sulphate tend to crystallize out as they are less soluble at the lower temperature. As the brine evaporates to saturation or supersaturation with potassium sodium sulphate, it tends to become supersaturated with sodium chloride also.

The word "supersaturated" is used in this description and in the claims to describe the condition in a brine such as Searles Lake brine from which crystallization can be effected. This condition in Searles Lake brine behaves similarly to ordinary supersaturation but does not usually crystallize out a salt upon the introduction of one crystal of that salt.

In my process, I first crystallize the sodium chloride from the concentrated brine and then crystallize potassium sodium sulphate from the resultant saline liquor.

In order that the greater part of the crystallization may take place in containers from which the salt crystals may be easily removed, the saturated brine is withdrawn by means of a pump 11 from a pond 25 thru a pipe, indicated by a dotted line 12 in the drawings, and discharged into a crystallizing tank 15. The tank 15 is of substantially cone shape with the apex of the cone disposed downwardly. The lower part of the cone divides into two conduits, an inlet conduit 13 provided with a regulating valve 14, communicating with the pump 11; and an outlet conduit 23 in communication with conveyor housing 21. A conveyor 22 is arranged in the housing 21 and may discharge into suitable storage bins, not shown. Disposed at a convenient distance above the bottom of the crystallizing tank 15 is a partition 19 provided with a plurality of perforations 20. An overflow launder 17 is affixed to the tank 15 around the upper periphery thereof and communicates with a pipe or conduit indicated by the line 18. A by-pass 36 is connected to the pipe 18 thru a valve 28 at a suitable connection 26, and leads to the pond 10.

The apparatus so far described is substantially identical to that outlined in my above mentioned copending application, and it is used in the same way. That is, the saturated brine withdrawn from the pond 25 is forced by the pump 11 thru the valve 14 and conduit 13 into the tank 15. Since the walls of the tank flare upwardly the velocity of the brine diminishes as it flows toward the top of the tank. As the current of concentrated brine ascends it passes thru the perforations 20 in the partition 19 and is separated into a number of small currents of momentarily increased velocity. Above the partition the liquor is exposed to a large number of crystals of sodium chloride. The combined surface of the sodium chloride crystals is sufficient to cause sodium chloride to crystallize from the upwardly flowing brine, and the newly formed crystals collect on the crystals primarily in the tank causing them to grow in size. It will be appreciated that the weight of the crystals tends to make them drop to the bottom of the tank but that the ascending current of liquid tends to cause the crystals to rise. Since the upward velocity of the brine decreases as the top of the tank is approached, the crystals arrange themselves at various heights in the tank according to their size. The larger crystals tend to pass thru the perforations in the partition 19 and succeed if they are sufficiently large to overcome the slightly increased liquid velocity at those points. On the other hand, they must also be small enough to pass thru the perforations. The dimensions of the crystals are thus automatically confined between certain limits and crystals passing thru the partition are of almost exactly uniform size.

The perforations 20 may be varied in number and in size to alter the size of the crystals passed by the partitions, and the number of partitions and their positions in the tank may be varied. By changing the partition or partitions and the perforations, and by regulating the current flow by means of the valve 13, I can control the size of the crystals passing to the bottom of a tank to a nicety.

The incoming brine keeps the large crystals which are passed thru the perforations 20 out of the inlet conduit 13 and they collect in the collecting conduct 23 and in the conveyor housing 21. These sodium chloride crystals are then carried by the conveyor to suitable storage bins.

Substantially all of the supersaturated sodium chloride may be removed from the saline liquor on one passage thru the crystallizing tank. In case the brine is not saturated or sufficiently superstaurated with potassium sodium sulphate and it is desired to supersaturate the brine again with sodium chloride in order to recover another yield of sodium chloride the slow moving brine overflowing the top of the tank into launder 17 is returned thru pipe 18 and by-pass 36 to the evaporating ponds 10 and 25 in which it is concentrated further and becomes supersaturated again with sodium chloride. It is then pumped thru crystallizing tank 15 and another yield of sodium chloride is obtained from the supersaturated brine.

When the brine overflowing into the overflow launder 17 no longer is substantially supersaturated with sodium chloride but has become properly supersaturated with potassium sodium sulphate by evaporation or cooling, it is conducted thru conduit 18, connection 26, valve 27, and inlet conduit 32 to a second crystallizing tank 34. It will be seen that valves 27 and 28 may be manipulated to direct the brine back to the pond or to the second tank. Crystallizing tank 34 is in all respects similar to the first crystallizing tank 15 but is preferably of larger size thruout. The rate of crystallization of potassium sodium sulphate is less than that of sodium chloride and the tanks may be proportioned to allow of a uniform flow of brine thru the system.

The saturated brine with most of the available sodium chloride crystallized out enters the tank 34 thru the inlet 32 and flows upwardly with a diminshing velocity to the top of the tank. Some distance above the bottom of the tank, the brine passes thru perforations in a partition 33 and above the partition is brought into intimate contact with a large surface of potassium sodium sulphate crystals which act in the manner of the sodium chloride crystals in the first tank, and crystallize potassium sodium sulphate from the solution. The crystals grow in size, arrange themselves in the tank according to their weight, and growing large enough, pass the partition to the collecting conduit 38 and conveyor casing 40. The potassium sodium sulphate crystals are carried by means of the conveyor 39 to a suitable storage place, not shown. Due to the low velocity of the brine overflowing tank 34, practically no potassium sulphate crystals can be carried over and the overflowing liquid is substantially free from that salt. The liquor caught in the launder 35 is returned by means of a pipe 37 to pond 10.

The process may be repeated a number of times to extract a large percentage of crystals from the brine. Several passages thru the sodium chloride tank 15 may be made for each passage thru the potassium sodium sulphate tank 34, or the crystallizing tanks may be used strictly in series, depending upon the condition.

In some cases it may be desirable to operate without the perforated partitions especially if the slope of the sides of the cone is very steep which would allow the brine to flow upward at a gradually retarded velocity without forming appreciable eddy currents in the brine.

I claim:

1. The process of recovering a given salt from a liquor supersaturated with the same and a second salt which comprises bringing the liquor into intimate contact with agitated crystals of the second salt to crystallize the second salt, recovering the second salt, bringing the liquor into intimate contact with agitated crystals of the given salt to crystallize the given salt, and recovering the given salt.

2. The process of recovering a given salt from a liquor containing the same and a second salt which comprises evaporating the liquor to supersaturation with both of the salts, bringing the liquor into intimate contact with agitated crystals of the second salt to crystallize the second salt, recovering the second salt, bringing the liquor into intimate contact with agitated crystals of the given salt to crystallize the given salt, and recovering the given salt.

3. The process of recovering a given salt from a liquor supersatuated with the same and a second salt which comprises bringing the liquor into intimate contact with crystals of the second salt held in suspension in an upward current of liquor having a diminishing velocity whereby the second salt is crystallized out, bringing the liquor into intimate contact with crystals of the given salt held in suspension in another upward current of liquor having a diminishing velocity whereby the given salt is crystallized out, and recovering the given salt.

4. The process of recovering a salt of a given solubility from a liquor containing the same and a second salt of greater solubility which comprises evaporating and cooling the liquor to supersaturation with both of the salts, crystallizing out the second salt of greater solubility by contacting the liquor with a large surface of agitated crystals of the second salt, crystallizing out the salt of given solubility by contacting the liquor with a large surface of agitated crystals of the given salt, and recovering the given salt.

5. The process of recovering two salts from liquor supersaturated with both salts comprising flowing the liquor into contact with agitated crystals of one supersaturated salt to crystallize said salt from solution, and flowing the liquor into contact with agitated crystals of the other salt to crystallize the other salt.

6. The process of recovering a given salt and a second salt from a liquor containing the same and other salts which comprises evaporating and cooling the liquor to supersaturation with the given and second salts, bringing the liquor into intimate contact with crystals of the second salt held in suspension in an upward current in the brine whereby the second salt crystallizes onto the suspended crystals of the second salt, recovering the second salt, bringing the liquor into intimate contact with crystals of the given salt held in suspension in an upward current in the brine whereby the given salt crystallizes onto the suspended crystals of the given salt, and recovering the given salt.

7. The process of recovering potassium sodium sulphate from a liquor containing the same and another salt which comprises evaporating the liquor to supersaturation with both salts, bringing the liquor into intimate contact with agitated crystals of the other salt to crystallize the other salt, bringing the liquor into intimate contact with agitated crystals of potassium sodium sulphate to crystallize potassium sodium sulphate, and recovering the crystals of potassium sodium sulphate.

8. The process of recovering potassium sodium sulphate from a liquor saturated with the same and another salt which comprises cooling the liquor, flowing the liquor into intimate contact with agitated crystals of the other salt in a container to crystallize the other salt, flowing the liquor into a second container and into intimate contact with agitated crystals of potassium sodium sulphate to crystallize potassium sodium sulphate, and recovering the crystals of potassium sodium sulphate.

9. The process of recovering glaserite from Searles Lake brine which comprises evaporating and cooling the liquor to effect a condition in the brine which acts similar to supersaturation, bringing the liquor into contact with agitated crystals of glaserite, and depositing the glaserite in solution upon the solid glaserite crystals.

10. The process of recovering potassium sodium sulphate from a liquor containing the same and another salt which comprises evaporating the liquor to supersaturation with potassium sodium sulphate and the other salt in a pond exposed to the sun and weather, flowing the liquor upwardly into a container and then with diminishing velocity into intimate contact with suspended crystals of the other salt to crystallize the other salt, removing the liquor, flowing the liquor upwardly into another container and then with diminishing velocity into intimate contact with suspended crystals of potassium sodium sulphate to crystallize potassium sodium sulphate, flowing the liquor back into the pond, and repeating the process.

11. The process of recovering two salts from a liquor containing the same which comprises supersaturating the liquor with both the salts, flowing the liquor upwardly into a container into intimate contact with solid crystals of one of the salts to deposit one of the supersaturated salts upon the solid crystals thereof, gradually retarding the velocity of the upward stream of liquor to separate the liquor from the crystals and to segregate the larger crystals from the smaller crystals, recovering the larger crystals of one of the salts, flowing the liquid upwardly into a second container into intimate contact with solid crystals of the other of the salts to deposit the other of the supersaturated salts upon the solid crystals thereof, gradually retarding the velocity of the upward stream of liquor to separate the liquor from the crystals and to segregate the larger crystals from the smaller crystals, and recovering the larger crystals of the other of the salts.

12. The process of recovering potassium sodium sulphate from a liquor supersaturated with the same and sodium chloride comprising evaporating and cooling the liquor, bringing the liquor into intimate contact with agitated crystals of sodium chloride to crystallize sodium chloride, flowing the liquor into intimate contact with agitated crystals of potassium sodium sulphate to crystallize potassium sodium sulphate and recovering the crystals of potassium sodium sulphate.

13. The process of recovering potassium sodium sulphate from a liquor containing the same and sodium chloride which consists in evaporating the liquor to supersaturation with potassium sodium sulphate and sodium chloride, flowing the liquor upward with diminishing velocity in a container into intimate contact with suspended crystals of sodium chloride to crystallize the sodium chloride, removing the liquor and causing it to flow upward with diminishing velocity in another container into intimate contact with suspended crystals of potassium sodium sulphate to crystallize potassium sodium sulphate, flowing the liquor back to be evaporated, and repeating the process.

14. The process of crytallizing a salt from a brine supersaturated with the salt comprising flowing the brine upwardly under crystallizing conditions, and controlling the size of salt crystals removed by varying the velocity of upward flow.

15. That step in a process of forming crystals of a salt from a solution supersaturated with respect to the salt comprising flowing the solution under crystallizing conditions and controlling flow velocity to control crystal size.

16. That step in a process of forming from a salt solution crystals of a substantially predetermined size comprising flowing a solution from which the salt crystallizes at a velocity sufficient to support substantially all crystals of less than said predetermined size.

17. That step in a process of forming from a salt solution crystals of a substantially predetermined size comprising flowing into a crystallizing region a solution from which the salt crystallizes at a velocity sufficient to support substantially all crystals of less than said predetermined size.

18. That step in a process of forming glaserite crystals of a substantially predetermined size from a brine supersaturated with the same comprising flowing the brine into a crystallization region and controlling the crystal size by flow velocity through said region.

19. That step in a process of forming from a salt solution crystals of a substantially predetermined size comprising flowing the solution into contact with a mass of fine crystals supported by the flowing solution.

20. That step in a process of forming from a salt solution crystals of a substantially predetermined size comprising flowing the solution into contact with a mass of seed at a velocity sufficient to support the seed and insufficient to support the crystals of said substantially predetermined size.

In testimony whereof, I have hereunto set my hand.

GEORGE B. BURNHAM.